March 8, 1927.

H. A. DE VRY 1,620,605

FILM SPOOL

Original Filed Sept. 4, 1926

Inventor:
Herman A. DeVry
By Fred Gerlach
his Atty.

Patented Mar. 8, 1927.

1,620,605

UNITED STATES PATENT OFFICE.

HERMAN A. DE VRY, OF CHICAGO, ILLINOIS.

FILM SPOOL.

REISSUED

Application filed September 4, 1926. Serial No. 133,536.

The invention relates to reels or spools for films.

The object of the invention is to provide an improved film reel or spool which is adapted for use as either a drive or idler spool on either a polygonal or cylindrical shaft, so that the spool may be universally used on both types of shafts. It has been found desirable to provide a film spool which is adapted for cameras of different construction so that it will be adapted for universal use in different cameras or those which are provided with either cylindrical or polygonal drive shafts, when used as a take-up spool, as well as being adapted to run idly around stationary shafts when the spool is used as a supply-reel spool.

The invention consists in the several novel features hereinafter set forth and more particularly defined by claims at the conclusion hereof.

Figure 1:
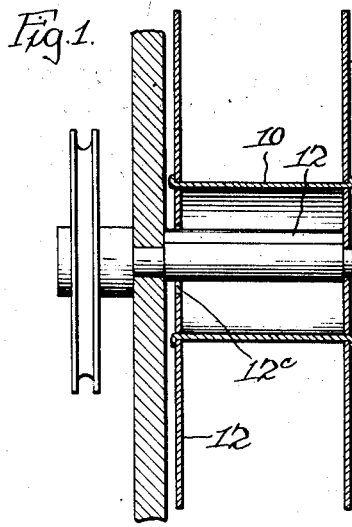
Figure 2:
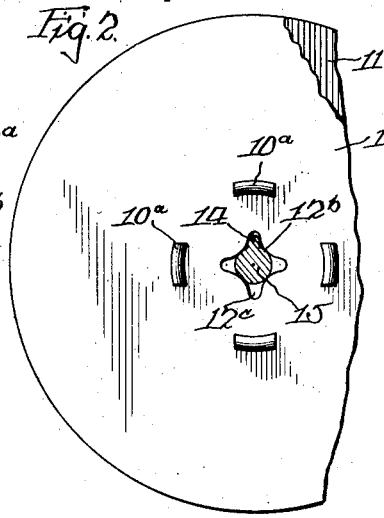
Figure 2A:
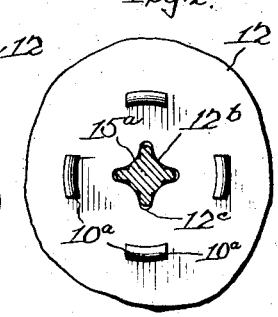
Figure 3:
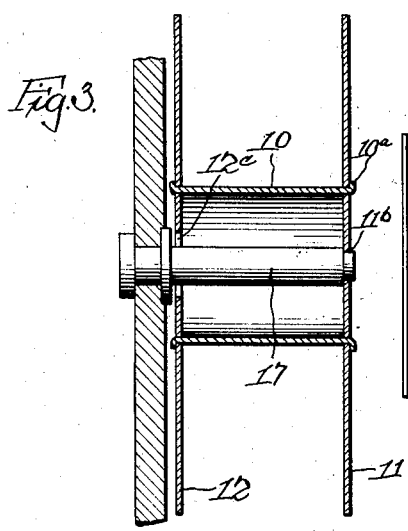
Figure 4:
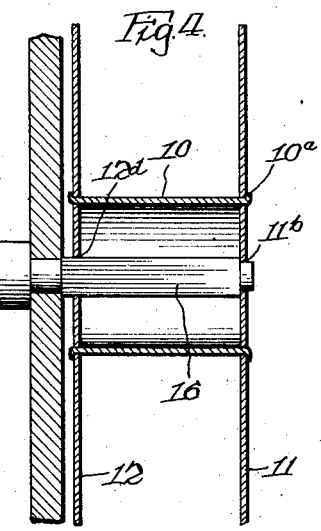
Figure 3A:
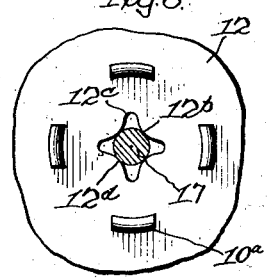
Figure 5:
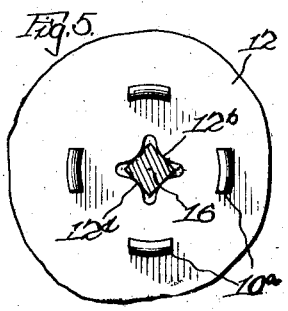
Figure 6:
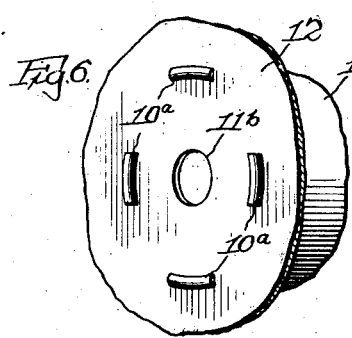
Figure 7:
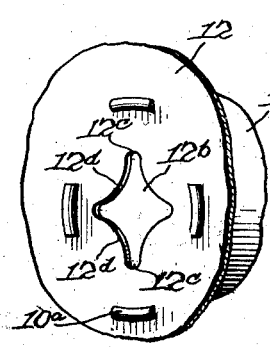

In the drawings: Fig. 1 is a vertical transverse section of the improved film reel mounted on a cylindrical drive shaft having a single key for use as a take-up spool. Fig. 2 is a side elevation of the spool with the shaft in section. Fig. 2$^a$ is a side elevation of the spool on a shaft with four keys. Fig. 3 is a vertical section of the improved film reel mounted on a cylindrical shaft for use as a supply spool. Fig. 3$^a$ is a detail of the cylindrical shaft and the opening in said spool. Fig. 4 is a vertical section of the invention mounted upon a square drive shaft used for a take-up spool. Fig. 5 is a side elevation of the spool on the square shaft. Fig. 6 is a detail perspective of the opening in one of the reel-sides for receiving the reduced end of a shaft. Fig. 7 is a view similar to Fig. 6 of the opening on the opposite side for receiving either a polygonal or cylindrical shaft.

The invention is exemplified in a film reel or spool which is formed of sheet metal and comprises circular sides 11 and 12 and an annular hub portion 10 to which the end of a film may be secured by a clip of the usual construction, as well understood in the art, and around which a film will be wound. Hub 10 is provided at its ends with a plurality of integral tongues 10$^a$ which are adapted to extend through arcuate slots formed in the sides 11 and 12 respectively. Tongues 10$^a$ are upset at their outer ends against the outer surface of the sides 11 and 12, so as to securely join the latter to the hub.

Side 11 is provided at its center with a circular opening 11$^b$ which is punched therein and is adapted to fit around and engage the circular end 12 either of a drive or a stationary shaft which may be reduced if desired, as shown in Figs. 1, 3 and 4.

Spool-side 12 is provided at its center with an opening 12$^b$ which has four radial or concave notches 12$^c$ which are spaced 90° apart, each conforming in shape substantially to the cross-section of and adapted to fit around a key 14 (Fig. 2) on a cylindrical drive shaft 15. The four notches also adapt the spool to fit around and be driven by a shaft 15$^a$ having any number of keys up to four, as shown in Fig. 2$^a$, and also adapt the spool-side to pass around a square drive-shaft 16, as shown in Fig. 5, the angular corners of the shaft entering the notches 12$^c$. Between the notches 12$^c$ the several portions of the margin of the opening 12$^b$ are each cut to form convex intermediate bearing-portions 12$^d$. The minimum diameter of the opening 12$^b$ is between the crowns of the portions 12$^d$ between the notches 12$^c$. This mimimum diameter corresponds substantially to the diameter of the cylindrical portion of a shaft 15 with a single key 14, as shown in Figs. 1 and 2, or the cylindrical portion of shaft 15$^a$ with four keys and also corresponds to the minimum diameter of a square shaft 16, as shown in Figs. 4 and 5. Therefore, these crowns will bear on and properly support one end of the spool and form a driving connection with all of said shapes of drive shafts, as well as bear on the periphery of a stationary shaft 17 when the spool is used as an idle or supply-spool and is not driven. These convex crowns of the portions 12$^d$ form what may be designated point contacts to make it possible to attain a reasonably accurate fit between the medial points in the sides or at the shortest diameter of a square shaft. As a result this construction exemplifies a spool which is provided with an opening of such shape that it may be drivably connected to a cylindrical shaft with a single key or four keys or any intermediate number, or a square shaft and will also make a rotative fit around a stationary cylindrical shaft 17 which is usually of the same diameter as the drive-shafts.

When the spool is placed on a cylindrical drive shaft 15, as shown in Fig. 1, the crowns or portions 12$^d$ will fit around the cylindrical portion of the periphery of the shaft and the key 14 will fit in one of the notches 12$^c$ so as to form a driving connection between the spool and the shaft to drive the reel. By having four notches 12$^c$ the reel may be connected at points 90° apart and thus eliminate waste of the film when the film is being secured to the hub 10 and the spool also may be placed on and driven by a similar shaft with four, three or two keys 14. When the spool is mounted in a square or polygonal drive shaft 15, the shortest diameter of which is the same as the diameter of cylindrical shaft 15, the corners of the shaft 16 will enter the notches 12$^c$ (Fig. 4), and the pointers or crowns of the portions 12$^d$ will snugly fit the medial points of the sides of the shaft respectively, the wider portions of the shaft engaging the convex sides of said portions thus forming a drive connection between the shaft 16 and the reel. When the spool is mounted on a stationary cylindrical shaft 17 (Fig. 3), the crowns of the portions 12$^d$ will fit around the shaft and form a bearing which permits the spool to run idly around the shaft 17.

The invention exemplifies an improved film spool or reel which may be used as a take-up spool on either a cylindrical or polygonal drive shaft, as found in different cameras, or as an idler spool on a stationary cylindrical shaft.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A film spool comprising a hub and sides, each of the sides being provided with a shaft opening, one of the openings having a plurality of outwardly extending notches to receive a key on a cylindrical shaft of a predetermined size and shaped to receive the corners of a polygonal shaft of a predetermined size, the margins of the opening between the notches being shaped to fit either the sides of a polygonal or the periphery of the cylindrical shaft with a key, and whereby the spool will be adapted to be driven by either of such shafts and to rotate on a plain cylindrical shaft.

2. A film spool comprising a hub and sides, each of the sides being provided with a shaft opening, one of the openings having a plurality of outwardly extending notches to receive a key on a cylindrical shaft of a predetermined size and shaped to receive the corners of a polygonal shaft of a predetermined size, the margins of the opening between the notches being inwardly crowned to fit either the central portions of the sides of a polygonal or the periphery of the cylindrical shaft with a key, and whereby the spool will be adapted to be driven by either of such shafts and to rotate on a plain cylindrical shaft.

3. A film spool comprising a hub and sides, one of the sides having a circular opening to receive the circular end of a shaft, and the other with an opening to fit around a cylindrical shaft of a predetermined size and a plurality of outwardly extending notches shaped to receive the key on the cylindrical shaft or the corners of a polygonal shaft of predetermined size, to form driving connections with either of such shafts and to rotate on a plain cylindrical shaft.

4. A film spool comprising a hub and sides, one of the sides having a circular opening to receive the circular end of a shaft, and the other with an opening having a plurality of outwardly extending notches shaped to receive the key on a cylindrical shaft or the corners of a polygonal shaft of predetermined size, and inwardly crowned margins between the notches to fit the central portions of the sides of a polygonal shaft or the periphery of a cylindrical shaft with a key, to form driving connections with either of such shafts.

Signed at Chicago, Illinois, this 31st day of August, 1926.

HERMAN A. DE VRY.